United States Patent [19]
Allen, Jr.

[11] Patent Number: 5,845,516
[45] Date of Patent: Dec. 8, 1998

[54] DRY ICE PELLETIZER AND METHOD FOR PRODUCTION

[75] Inventor: Russel G. Allen, Jr., San Antonio, Tex.

[73] Assignee: Carbonic Reserves, San Antonio, Tex.

[21] Appl. No.: 791,394

[22] Filed: Jan. 30, 1997

[51] Int. Cl.$^6$ .................................................. F25D 3/12
[52] U.S. Cl. .............................................. 62/605; 62/384
[58] Field of Search ........................... 62/341, 384, 604, 62/605

[56] References Cited

U.S. PATENT DOCUMENTS

| | | | |
|---|---|---|---|
| 3,576,112 | 4/1971 | Frost et al. | 62/341 |
| 3,835,657 | 9/1974 | Scudder | 62/605 |
| 4,770,684 | 9/1988 | Tsukada et al. | 62/604 |
| 4,780,119 | 10/1988 | Brooke | 62/12 |
| 5,301,509 | 4/1994 | Lloyd et al. | 62/35 |
| 5,385,023 | 1/1995 | Montemayor et al. | 62/10 |
| 5,419,138 | 5/1995 | Anderson et al. | 62/35 |
| 5,473,903 | 12/1995 | Lloyd et al. | 62/35 |
| 5,475,981 | 12/1995 | Becker | 62/35 |

FOREIGN PATENT DOCUMENTS 1300597  12/1972  United Kingdom ..................... 62/604

OTHER PUBLICATIONS

TOMCO$_2$ Systems, Sep. 22, 1993, 500 & 1000 Lb./Hr. Dry ice Extruders (4 pages).

*Primary Examiner*—William E. Tapolcai

[57] ABSTRACT

An improved dry ice pelletizer and method for significantly increased pellet production. The improvement consists of multiple injection ports used for the timed introduction of liquid carbon dioxide into a dry ice extrusion cylinder so that the cylinder can be more completely filled with carbon dioxide snow before extrusion takes place. Part of the improvement stems from the use of a solid mass of carbon dioxide, called a puck, which is chamfered and serves to capture carbon dioxide vapor and snow within the compression cylinder. The resulting improvement in carbon dioxide pellet output is roughly 400% over that achieved by conventional methods. The inventive improvement may also be installed as a retrofit to conventional dry ice pellet extrusion machines.

8 Claims, 7 Drawing Sheets

DRY ICE PELLETIZER AND METHOD FOR PRODUCTION

FIELD OF THE INVENTION

This invention relates generally to the field of dry ice manufacture and, more particularly, to a method and apparatus used to produce dry ice pellets at a rate significantly higher than that achieved in the prior art.

BACKGROUND OF THE INVENTION

Dry ice has been traditionally produced and distributed in blocks, each weighing about 55 pounds. These blocks are cumbersome, expensive, and require extra effort to crush them for reduction to a reasonable size that can be easily handled and used in many applications. Due to these limitations, dry ice is now produced in pellet form as a matter of convenience. Such pellets are commonly produced by dry ice pelletizers which are relatively small and less expensive to manufacture than those dry ice machines which produce blocks of dry ice. Dry ice pellets are easily packaged by the manufacturer and subdivided by the consumer into convenient portions for use.

Dry ice pellets are used in a vast array of applications, including the processing and preservation of meats and other foods. Dry ice is the preferred means of cooling in such applications, since it imparts no color, odor, or taste, and has no lingering deleterious effect on the food. In these applications, dry ice pellets are delivered directly onto the food being processed to rapidly cool it and keep it below a specified maximum temperature to prevent spoilage, both during processing and prior to refrigerated storage.

Dry ice also is desirable for the processing of food because its sublimes directly from solid-state to the gaseous phase, leaving no residue behind after yielding its cooling effect; no clean-up or removal of residual liquid is required. Furthermore, $CO_2$ is neither toxic, poisonous, reactive with other chemicals, or flammable.

Figure 1:
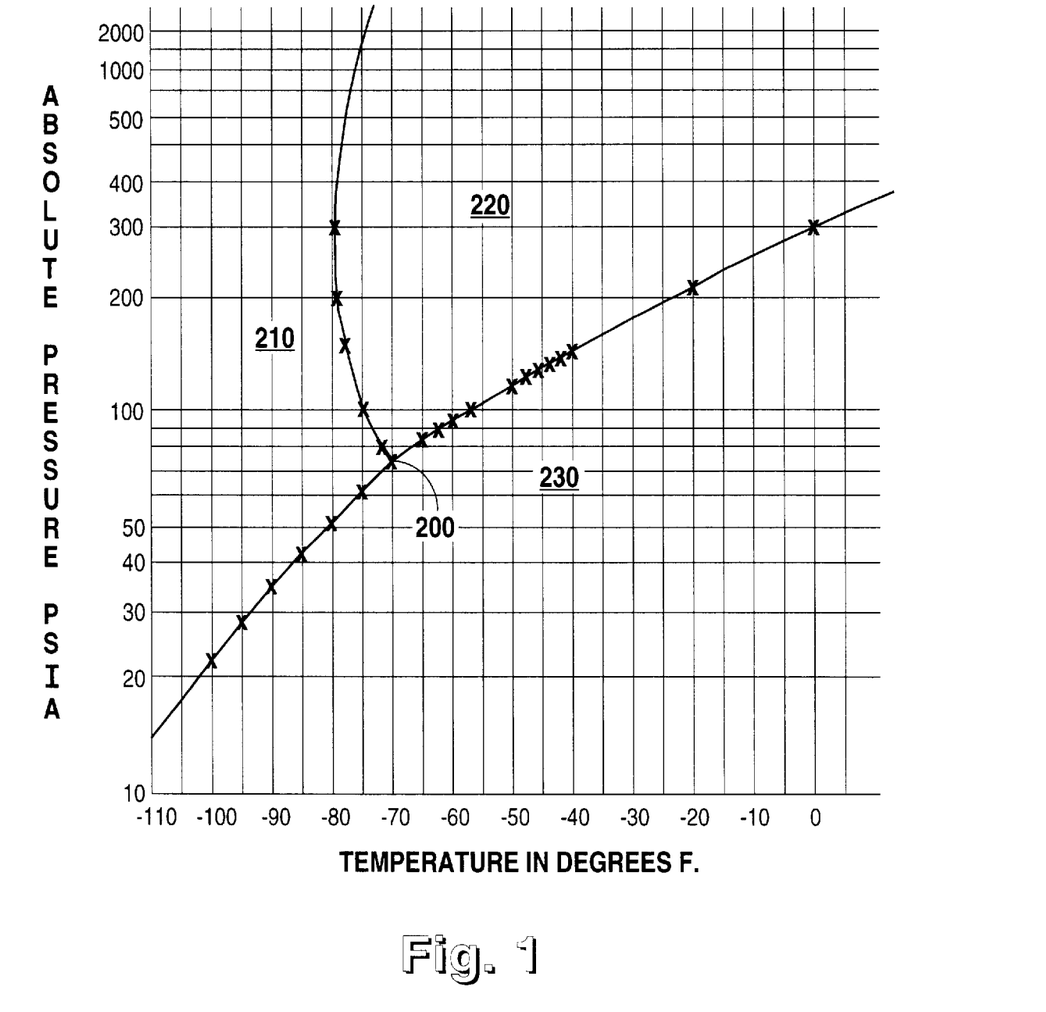
FIG. 1 is a $CO_2$ equilibrium curve illustrating the triple point, which exists at the intersection of $CO_2$ solid, liquid, and vapor phases.

In its solid state, at standard temperature and pressure, carbon dioxide ($CO_2$) has a constant and stable temperature of $-109.33°$ F. Carbon dioxide is normally transported in its liquid state, and stored in refrigerated tanks at a pressure of 265 psia, and a corresponding temperature of $-8°$ F. These states of existence are easily seen by referring to FIG. 1, which depicts the various phases of existence for CO2 (i.e. solid phase (210), liquid phase (220), or gaseous phase (230)).

When liquid $CO_2$ is permitted to flash through an expansion device into a chamber (referred to herein as a "compression cylinder") at atmospheric pressure from a nominal storage pressure of 265 psia, part of the liquid will turn into gas and part of the liquid will solidify. The proportionate amounts of gaseous $CO_2$ and solid $CO_2$ depend on the pressure and temperature of the liquid $CO_2$ fed into the cylinder. The lower the pressure and temperature, the greater the proportion of solid $CO_2$ (referred to hereinafter as "snow") that will be formed as a result of the free expansion. Rapidly expanding liquid $CO_2$ at 265 psia and $-8°$ F. to atmospheric pressure yields one pound of dry ice as snow, and 1.08 pounds of vapor. This snow may then be compacted through various processes to form solid blocks or pellets of dry ice.

Known dry ice pelletizers, such as that disclosed by Brooke in U.S. Pat. No. 4,780,119, and assigned to TOMCO$_2$ Equipment Co., commonly use a piston to compress dry ice snow into a block, or to compress and extrude the dry ice snow through a die to form solid pellets. The Brooke machine is limited in production to approximately 600 pounds/hour for each cylindrical chamber used. Attempts to increase production capacity for this machine have resulted in a pair of chambers which are hydraulically linked so as to increase the capacity of the unit to 1200 pounds per hour.

It has been discovered that existing technology, such as that used in the Brooke machine, acts to limit the production rate by filling the cylinder with $CO_2$ snow in a self-defeating manner. Typically, a pelletizer compression cylinder will have a liquid $CO_2$ injection port located somewhere near the center of the cylinder and a vent screen, for venting the gaseous/vapor $CO_2$ produced during the flash operation, located at one end of the cylinder. What normally occurs during the flash operation is that $CO_2$ snow will collect in the cylinder, first by the vent screen at the rear of the cylinder, and then build in volume toward the injection point. However, by first collecting in front of the vent screen, the $CO_2$ snow blocks the vapor injection path as the cylinder fills. This defeats the process of forming $CO_2$ snow in two ways: It takes longer to fill the cylinder (or, more often, the cylinder will not fill completely), and the "degas" time is increased (i.e. it takes more time for the pressure built up during the flash operation to return to ambient because the venting ports are covered). If compaction and extrusion begins before degas pressure reduction can occur, gas pockets are trapped in the compacted snow; the resulting solid pellets shatter due to explosive expansion of the gas pockets when the compressed snow reaches the die opening.

It has also been discovered that simultaneously injecting liquid $CO_2$ via multiple adjacent ports, or ports that are located directly across the cylinder from each other, as illustrated by FIG. 3, reference number 32, of U.S. Pat. Nos. 5,301,509 and 5,473,903, issued to Lloyd et al., does not significantly increase the pelletizer production rate for the reasons stated above.

In an effort to overcome the limitations of the Brooke machine, U.S. Pat. No. 5,419,138, issued to Anderson et al, describes an apparatus which makes use of $CO_2$ snow formation, $CO_2$ snow compaction, and dry ice pellet extrusion as simultaneous operations to achieve production rates on the order of 700 to 1,000 pounds per hour. However, this apparatus is quite complex, having many more parts than the Brooke machine. In addition, a specially constructed, cylindrical filter cartridge is required to overcome the difficulties introduced by vent screen obstruction, mentioned previously.

U.S. Pat. No. 5,475,981, issued to Becker, describes a dry ice pelletizer which is computer-controlled. While computer control helps to achieve a uniform size and density pellet, it does nothing to enhance the production rate of the basic pelletizer machine.

None of the devices cited above adequately address the need in industry for a new machine that exhibits an increased $CO_2$ pellet production rate, or to provide a simple and inexpensive upgrade to conventional machines for significant increases in production. Either more cylinders are required to increase the output rate (as mentioned in the Brooke patent), or an entirely new machine must be constructed (as described in the Anderson et al patent).

SUMMARY OF THE INVENTION

The conventional pelletizer consists of a cylinder, into which liquid $CO_2$ is introduced through an injection port, a piston used to compress the resulting $CO_2$ snow into a single mass of solid dry ice, one or more venting ports for the release of built-up pressure as the liquid $CO_2$ turns into $CO_2$ vapor and snow, and an extrusion die, through, which the mass of solid dry ice is forced via the compressive power of the piston to produce dry ice pellets.

When the conventional pelletizer is first placed into operation, there is a period of time during which the compression cylinder temperature drops from room temperature to a temperature which is closer to that of solid dry ice (i.e., known as the "cool down" period). During this cool down period, the $CO_2$ snow cools the die and the cylinder, but no single mass of solid dry ice is formed as the piston compresses the snow due to its rapid sublimation and high rate of vapor production. The cool down period may last from five to fifteen complete compression cycles before the cylinder and die are cold enough to allow formation of a solid disk of dry ice (known as a "puck"). During the cool down period, because there is no puck formed, the piston travels the full length of the cylinder at a fairly high rate of speed.

Once the puck is formed, in the conventional production method, liquid $CO_2$ is injected into the cylinder after the piston has been fully retracted (i.e. to the rear of and beyond the venting ports). $CO_2$ snow begins to collect near the venting ports at the rear of the cylinder, and then builds toward the injection point. Collection of $CO_2$ snow near the venting ports works to block the $CO_2$ vapor path as the cylinder fills. The result is an incompletely filled cylinder and an increased amount of degas time (required to return the interior cylinder pressure to that of the ambient atmosphere).

The discovery that $CO_2$ snow will compact to roughly one-third of its original volume after flashing (and before extrusion begins) in the pelletizer leads to the inventive improvement, which lies in the innovative use of a first and second injection port. The first injection port is positioned at a point approximately one-third of the way along the length of the compression cylinder, and proximate to the end of the cylinder which contains the extrusion die. The second port is positioned at a point approximately two-thirds down the length of the cylinder, again measured from the end of the cylinder containing the extrusion die, and also at a point which is just before the beginning of the venting port location.

All operations of the improved pelletizer are directed by a programmable controller. This allows for precise observation of internal cylinder fill pressure; piston speed, position, and force control; and liquid $CO_2$ injection timing. Upon startup, the piston is fully retracted and the cylinder is warm. The first injection begins with both injection ports opened for the rapid introduction of liquid $CO_2$ into the cylinder. If the pressure within the cylinder exceeds the triple point (at which $CO_2$ may exist in the solid, liquid, and gas phases), a pressure switch trips and the controller briefly stops injection to allow the pressure to drop back down. When the timed injection period is complete, the degas timer within the controller begins to count down for the release of pressure within the cylinder. When the degas timer completes its timing period (which is experimentally determined), the piston moves forward at high speed until the pressure of the compacted $CO_2$ snow exerted against the piston starts to increase within the cylinder. A hydraulic pressure switch senses the increasing pressure, and sends a signal to the controller, which results in a much slower piston speed. The piston does not travel all the way to the face of the die, but stops just short, so as to form a "puck" at the die face which will contain the next injection of liquid $CO_2$. The piston is then retracted at high speed toward the starting port. However, on this retract stroke, the first injection point (closest to the die) is opened as soon as the piston passes that port. As the piston continues to retract, the second injection port is opened sometime after the piston passes it, but before the piston is fully retracted. After both $CO_2$ injection port controller timers time out, the degas controller timer is started, and the extrusion part of the cycle begins anew.

By staggering the injection port locations and overlapping injection timing, a 400% increase in production rate over single-port injection machines can be achieved. The first injection point should be located behind the compressed $CO_2$ snow puck. This first point is injected with liquid $CO_2$ immediately after the front of the piston passes on the retraction portion of the stroke. The gas produced during this first injection is unable to vent through the vent ports until the retracting piston front edge exposes some portion of the vent port area. The second injection point is located near the front edge of the vent port area. Injection into the second port is begun after the piston fully retracts, exposing the entire vent port area. By locating the last injection point close to the front of the injection helps to keep the vent area clear, allowing the cylinder to fill completely. This special timing of injection and physical arrangement of the ports allows more snow to be captured in a shorter time, and the degas time required for reducing cylinder pressure to ambient is lessened, because the vent area is clear.

Accordingly, the present invention provides:

(a) an improved dry ice pelletizer and method of pellet production;

(b) an improved dry ice pelletizer and method of pellet production which serves to increase the production rate over conventional pelletizers by approximately 400%;

(c) an improved dry ice pelletizer and method of pellet production which can be used to inexpensively retrofit conventional dry ice pelletizing machines;

(d) an improved dry ice pelletizer and method of pellet production which does not require an extensive array of mechanical parts to implement; and (e) an improved dry ice pelletizer and method of pellet production which can be used to easily upgrade existing dry ice pelletizers based on conventional ram-type cylinder and vent construction.

Other objects and advantages of the present invention will become apparent in the following specification when considered in light of the attached drawings, wherein a preferred embodiment of the invention is illustrated.

DETAILED DESCRIPTION OF THE PREFERRED EMBODIMENT

Figure 2:
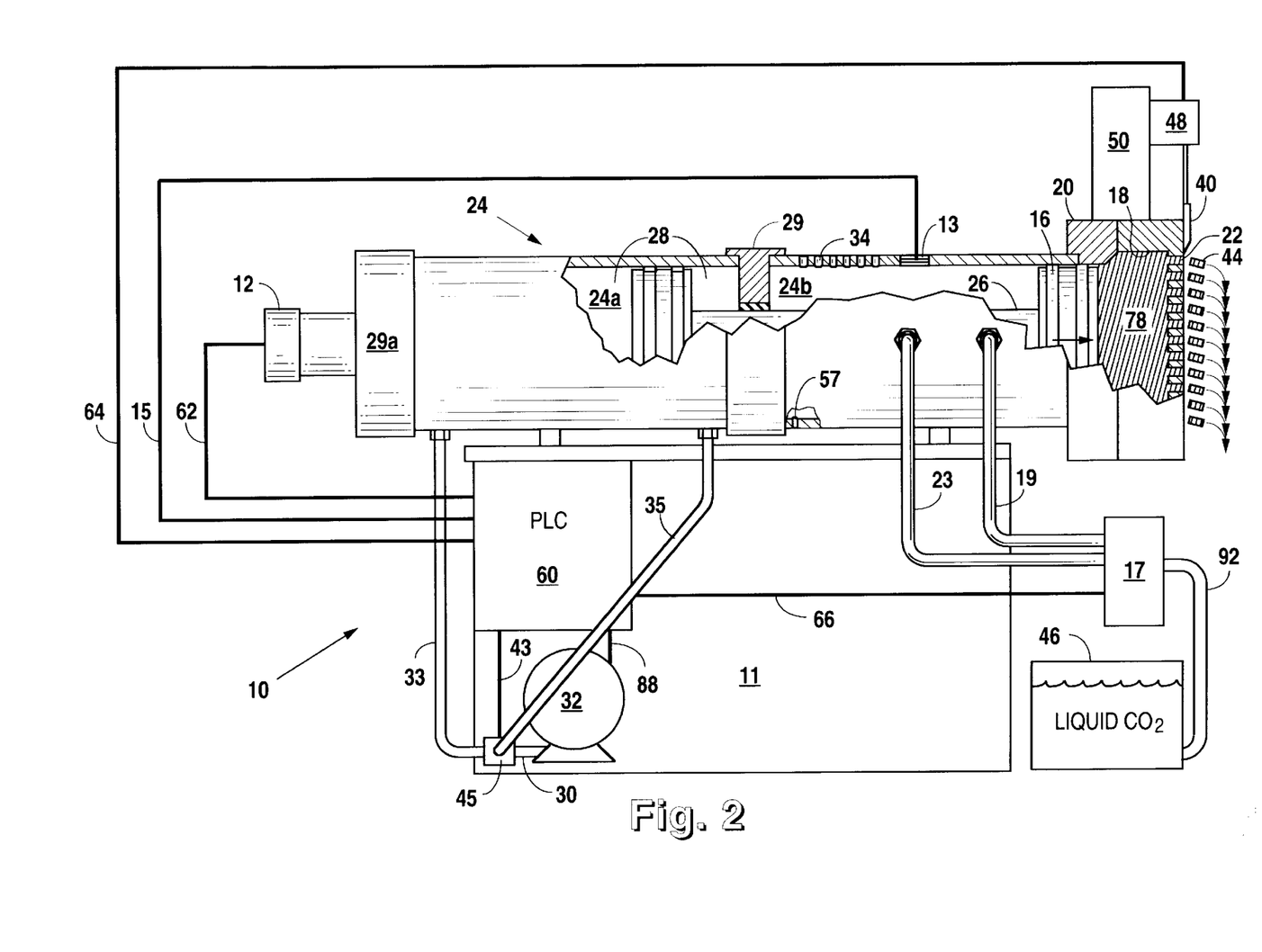
FIG. 2 is a partial vertical-section view of the dry ice pelletizer of this invention.

Referring now to FIG. 2, a front-elevation view of the pelletizer (10) of this invention is shown in vertical section. The pelletizer (10) comprises movable piston (16) operative within a closed cylinder (24), which is divided into two parts: hydraulic cylinder (24a) and compression cylinder (24b). Piston (16) is activated to move within snow cylinder (24b) by pumping hydraulic fluid (28) into and out of hydraulic cylinder (24a), which moves hydraulic piston (26a), connected to piston rod (26), which is in turn connected to piston (16).

It should be noted that cylinder (24) has been illustrated as a single, closed cylinder (divided into two parts), for simplicity. Such a design would be impractical in an operational pelletizer, simply because hydraulic fluid (28) would seep into compression cylinder (24b), causing contamination of the $CO_2$ snow. Additionally, such an arrangement would cause hydraulic fluid (28) to freeze on piston rod (26), rapidly abrading coupler (29), which serves to center piston rod (26) within cylinder (24). Industrial pelletizers are usually constructed by physically separating the hydraulic cylinder (24a) from compression cylinder (24b), so that there is no such direct interaction between the cylinders (24a and 24b). Instead, piston rod (26) takes the form of a mechanical coupling, which allows remote operation of piston (16) via hydraulic fluid (28) pressure applied against hydraulic piston (26a) within hydraulic cylinder (24a).

Piston (16) compresses $CO_2$ snow formed within compression cylinder (24b) by atmospheric decompression of liquid carbon dioxide fed under pressure from $CO_2$ source (46) and main $CO_2$ feed tube (92), via secondary feed tubes (19) and (23) and a control valve body (17), to form a single mass ("block") of solid dry ice (78). As can be seen in FIG. 2, solid dry ice (78) is extruded under pressure through a die (20) having a plurality of cross-sectional apertures or die openings (22) forming extrudate passing through each die opening (22). The piston (16) is interconnected to and moved by a centrally disposed piston rod (26). Hydraulic fluid (28) is pumped into hydraulic cylinder (24a) through secondary hydraulic compression feedline (33), connected to pump (32) via valve (45), and primary hydraulic feedline (30), which in turn moves hydraulic piston (26a), and therefore piston (16), toward die (20). To reverse the travel direction of piston (16), hydraulic fluid (28) is removed from hydraulic cylinder (24a) via secondary hydraulic compression feedline (33) and pumped into hydraulic cylinder (24a) via secondary hydraulic retraction feedlines (35).

In use, piston (16) is fully retracted rearwardly to enable liquid carbon dioxide to enter compression cylinder (24b) via secondary feed tubes (19) and (23), whereupon forward compressing movement of the piston (16) compacts the $CO_2$ snow formed to make a dense mass of solid dry ice (78) in the compression chamber (18) formed between piston (16) and die (20). Gaseous carbon dioxide formed during flashing can escape from inside the compression cylinder (24b) through one or more vents (34) after piston (16) retracts; the remaining snow can be compressed to form solid dry ice having a pre-determined density in weight per volume. Solid dry ice (78) passes through die (20) to form extrudate having a density pre-determined by the hydraulic pressure gauge sensing device (12), which is an electronic device used to measure the hydraulic pressure exerted by piston (16) against the solid dry ice (78) located within compression chamber (18).

Located outside cylinder (24) and laterally adjacent to die (20) is a cutting means (40) operative to reciprocate downwardly and slide against the exterior surface of die (20) to produce pre-determined length pellets (44). The cutting means (40) is operatively interconnected to a control means (48) secured above die (20) to a vertical-upright support (50) securely attached to cylinder (24) via die (20). Pellet density is controlled by the level of applied pressure from piston (16) during formation of solid dry ice (78) in compression chamber (18). Thus, the length and density of the resulting dry-ice pellets (44) are controlled, along with their cross-sectional dimension (via die 20).

Figure 3:
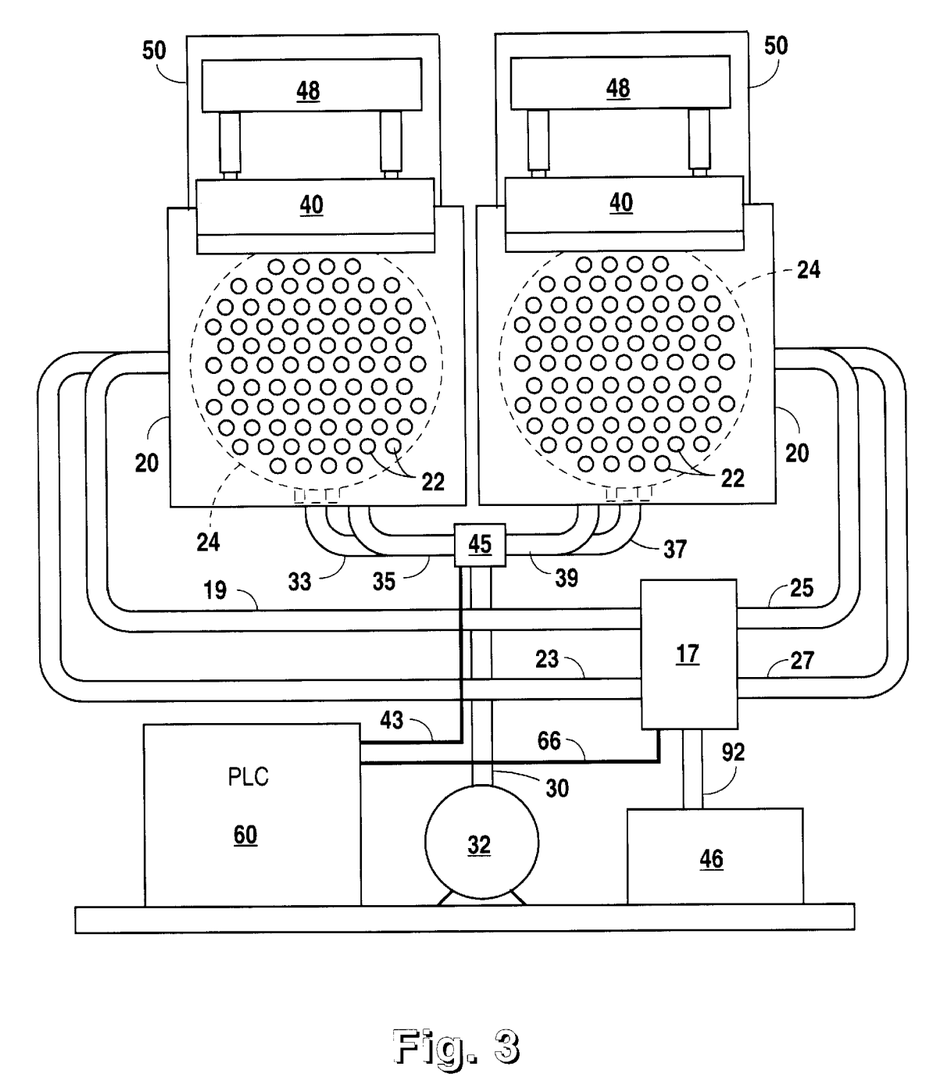
FIG. 3 is a partial side-elevation view showing the extrusion end of the pelletizer.

The dry ice pelletizer (10) is computer controlled to simultaneously coordinate and activate various operations in response to predetermined set parameters. A general purpose computer or programmable-logic controller (PLC) ((60) is electrically interconnected to hydraulic pressure gauge sensing device (12) by an electrical lead (62), operative to measure the hydraulic pressure developed by the force of solid dry ice (78) against the movement of the piston (16) during compression of carbon dioxide snow into solid dry ice within compression chamber (18). Upon reaching the preselected pressure, PLC (60) then initiates a controlled intermittent repeating start-stop action of the piston (16) within the compression cylinder (24b) by means of pump actuation lead (88) to enable the cutting means (40) to effect a clean cut during the momentary stop-mode of the piston (16). The start-stop functions can be actuated by increasing and maintaining the maximum operating pressure during extrusion from the start function followed by considerable reduction in extrusion pressure momentarily for the stop function. Upon actuating the stop function, PLC (60) actuates the cutting means (40) via electronic lead (64) whereby the stop mode and cutting mode operate simultaneously. The stop mode actuated in conjunction with a reduction in applied piston pressure is necessary to avoid continuous extrusion during the cutting operation and avoid non-uniform size pellets (44). PLC (60) further controls the $CO_2$ source (46) via valve body (17) by acting to adjust the timing for liquid carbon dioxide injection into compression cylinder (24b) via secondary feed tubes (19) and (23). Referring now to FIG. 3, a partial-side elevation view of the pelletizer invention can be seen. This figure details a dual-cylinder version of the instant invention. As is more readily apparent from this frontal view, secondary feed tubes (19) and (23) are used to direct liquid $CO_2$ from $CO_2$ source (46) and main $CO_2$ feed tube (92) via valve body (17) and control by PLC (60). The other cylinder (24) is likewise supplied by secondary feed tubes (25) and (27), valve body (17), main $CO_2$ feed tube (92), and $CO_2$ source (46). PLC (60) directs the actuation of valve body (17) by way of electronic lead (66).

The dual-cylinder version of the instant invention is the most efficient way to make use of a single hydraulic supply. In FIG. 3, hydraulic valve (45), which operates secondary hydraulic compression feedlines (33) and (37), and secondary hydraulic retraction feedlines (35) and (39), can be seen.

The primary hydraulic supply line (30) is flooded with hydraulic fluid (28) by hydraulic pump (32), and the fluid is directed to one cylinder (24) or the other cylinder (24) by way of hydraulic valve (45), which is in turn controlled by PLC (60) via electric valve lead (43). In use, when one cylinder (24) is in the compression phase of operation, the other cylinder (24) is in the retraction phase. Thus, hydraulic fluid (28) can be recycled between the two cylinders.

Figure 4:
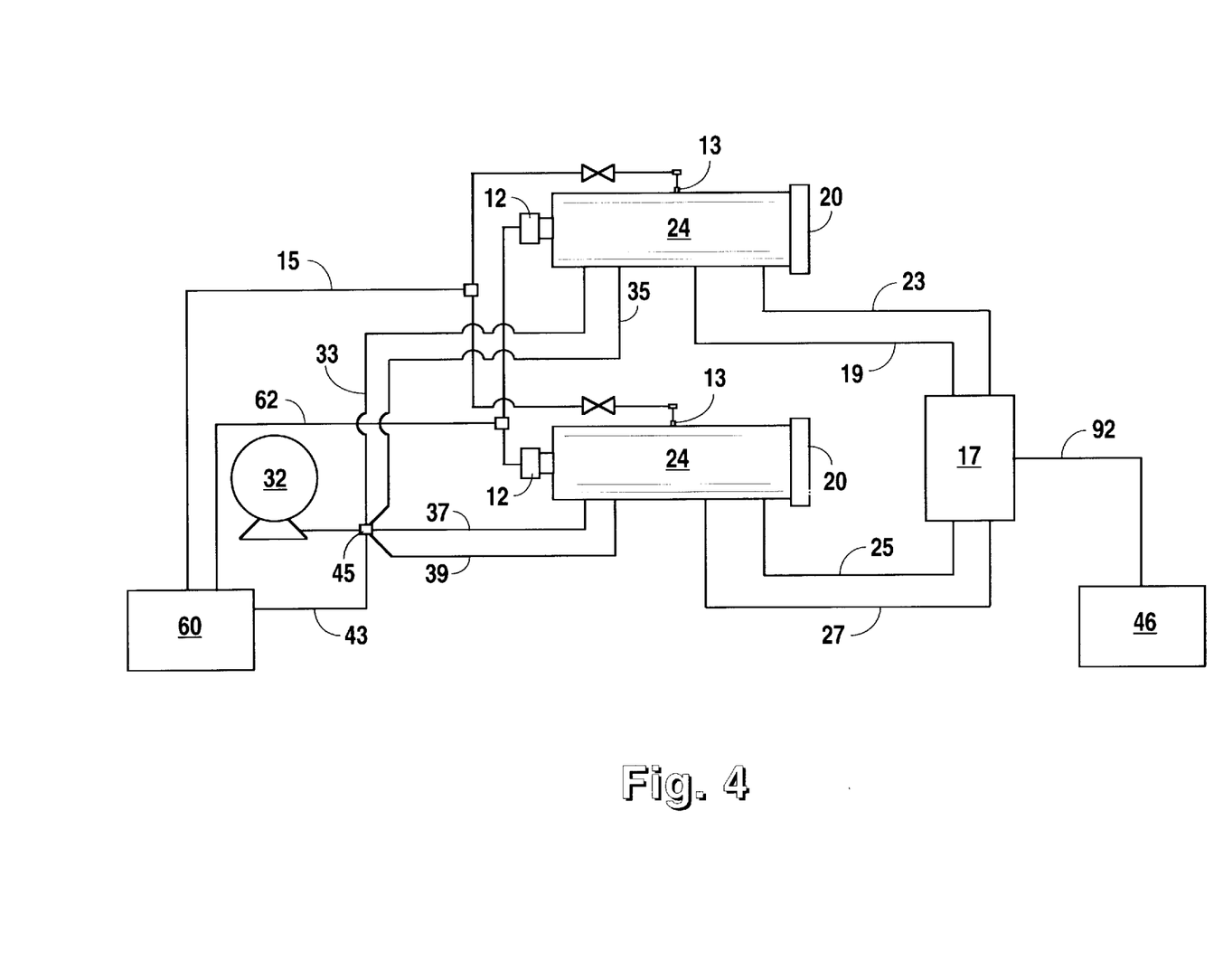
FIG. 4 is a simplified schematic diagram indicating the hydraulic and liquid $CO_2$ supply systems for the pelletizer.

FIG. 4 diagrams the hydraulic and $CO_2$ supply pathways in schematic view. In this figure, it is easily seen that PLC (60) can detect the pressure within compression cylinders (24b) by means of cylinder fill pressure sensors (13) and electronic pressure lead (15). The inventive improvement also contemplates measurement of injection back-pressure (not shown) in secondary feed tubes (19) and (23) as a means of determining the extent of $CO_2$ snow formation within compression cylinder (24b).

Figure 5:
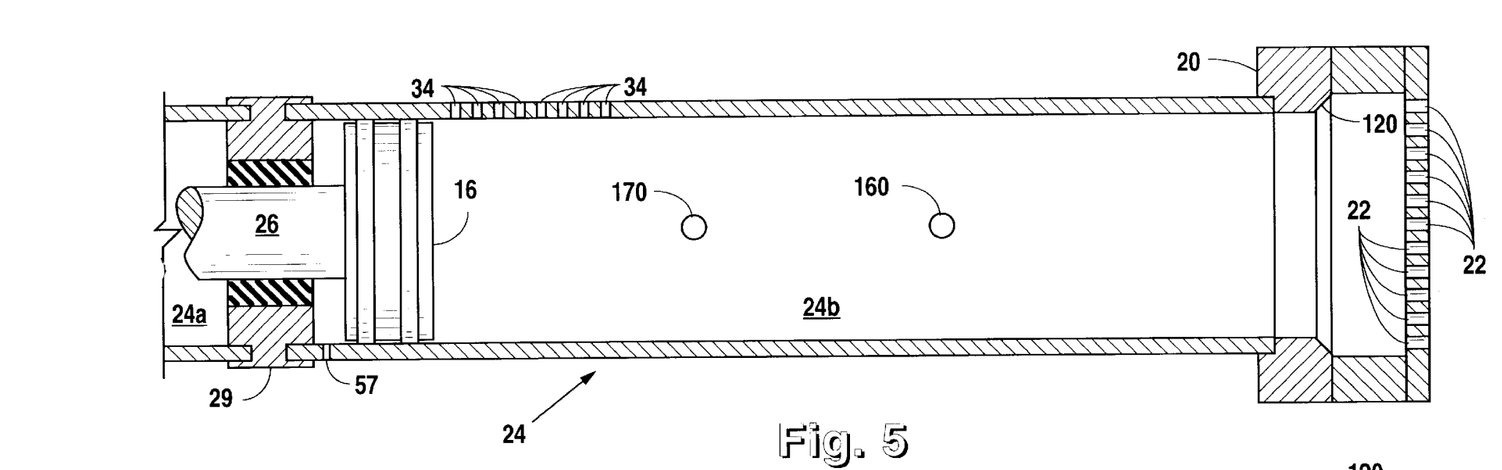
FIG. 5 is a side, cross-sectional, view of a compression cylinder within the present invention with the piston fully retracted.

Referring now to FIG. 5, a side, cross-sectional, view of one cylinder within the instant invention can be seen. As in conventional pelletizers, the improved pelletizer (10) contains a compression cylinder (24b), to which is affixed an extrusion die (20) at one end and a flange (29a) at the other end. Piston (16) is centered within cylinder (24) by means of coupler (29) and is extended toward extrusion die (20) by means of piston rod (26). Piston (16) is also retracted toward coupler (29) via piston rod (26). Extrusion ports (22) are located in extrusion die (20) to permit the expulsion of solid dry ice in the form of pellets. One or more venting ports (34) are located at the rear of compression cylinder (24b), proximate to coupler (29).

The use of two $CO_2$ injection ports, first injection port (160) and second injection port (170), staggered in distance along the length of compression cylinder (24b) allows for a more complete filing of compression cylinder (24b) with $CO_2$ snow prior to compression of the snow into a single mass of dry ice. The approximate location of first injection port (160) is one-third of the distance along the compression cylinder (24b), as measured from the end of the compression cylinder (24b) containing extrusion die (20). The approximate location of the second injection port (170) is approximately two-thirds of the distance along the compression cylinder (24b), also measured from the end of compression cylinder (24b) containing extrusion die (20), but not so far along compression cylinder (24b) as to intrude upon the area occupied by venting ports (34).

In order to obtain consistent dry ice pellet density and quantity, all operations of the improved pelletizer are controlled by PLC (60), which monitors the parameter of atmospheric pressure [via cylinder fill pressure sensor (13)] within compression cylinder (24b) developed when liquid $CO_2$ is injected via first injection port (160) or second injection port (170). The PLC (60) is also used to monitor the hydraulic pressure [via hydraulic pressure gauge sensing device (12)] exerted against piston (16) when piston rod (26) is used to move piston (16) along the length of compression cylinder (24b) toward extrusion die (20) as $CO_2$ snow is compacted.

This invention anticipates that the movement speed and location of piston (16) along the length of compression cylinder (24b) can also be monitored, using shaft position encoders (not shown) or other locational feedback devices well known in the electronic art, to provide additional feedback to PLC (60) for yet another increase in production output rate of the improved pelletizer. Because of economic considerations, the improved pelletizer production process relies on solely on the measured pressure readings obtained by PLC (60), together with the injection/degas process timing and known movement speeds (at a given hydraulic pressure and point within the production cycle) of piston (16) to determine the relative location of piston (16) within compression cylinder (24b). A direct reading of piston location requires additional sensing means (e.g. shaft position encoders not shown here), at a commensurately greater overall cost.

In FIG. 5, it can be seen that piston (16) is located in the completely retracted position. When the improved pelletizer is first started, it must go through a "cool down" period, where the temperature of the compression cylinder (24b) is brought down from ambient room temperature to something closer to the temperature of the $CO_2$ snow which is formed therein. In the improved pelletizer, the first injection of liquid $CO_2$ occurs with piston (16) fully retracted and first injection port (160) and second injection port (170) opened. Liquid $CO_2$, at a pressure of between 210 and 280 psia, and a temperature of from $-21°$ F. to $-5°$ F., respectively, is injected into compression cylinder (24b). When the timed injection period (determined by experimentation) is complete, the PLC (60) begins a degas timer to allow vaporized $CO_2$ to exit one or more venting ports (34). The time of injection is approximately 18 seconds, and the degas time is approximately 5.5 seconds for a cylinder which is 8 inches in diameter and three feet long. This provides for a total piston cycle time (including compression and retraction) of approximately 42 seconds. If the pressure within compression cylinder (24b) exceeds the triple point (200) (see FIG. 1) during this initial injection period (where $CO_2$ may exist in either a solid phase (210), liquid phase (220), or gaseous phase (230), depending on the temperature—see FIG. 1), the PLC (60) acts to briefly inhibit injection to allow the pressure within compression cylinder (24b) to drop. Injection is then continued until the timed injection period is complete. At this point, the degas timer within the PLC (60) begins and $CO_2$ vapor within compression cylinder (24b) is vented to the atmosphere by way of one or more venting ports (34).

Figure 6:
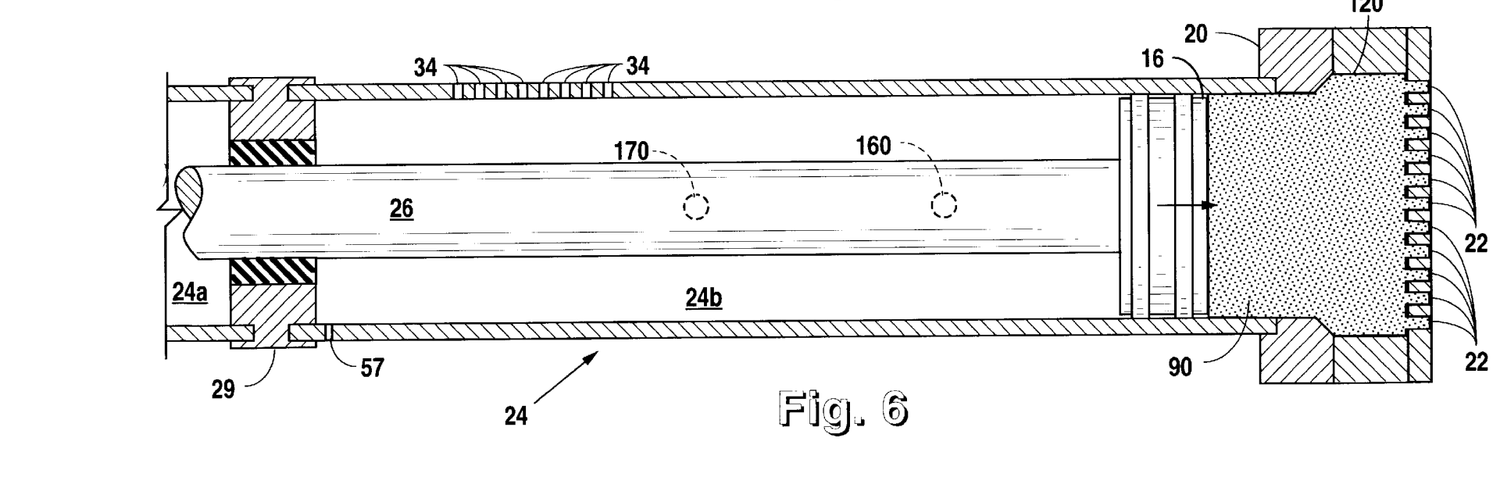
FIG. 6 is a side, cross-sectional, view of a compression cylinder within the present invention just before puck formation occurs.

When the degas timer has completed its period, piston (16) moves forward at a high rate of speed, moving from the fully retracted position toward the extrusion die (20) at approximately 12 inches per second (high volume, low pressure mode). Piston (16) continues at this high speed until the PLC (60) senses [via pressure gauge sensing device (12) and electrical lead (62)] that the hydraulic pressure required to move piston (16) begins to increase. The increase in hydraulic pressure signals the PLC (60) that compression of the $CO_2$ snow (90) has begun. At this point, PLC (60) switches the hydraulic system to low speed movement by means of pump actuation lead (88); the piston now moves at about one inch per second (low speed, high pressure mode). Piston (16) continues to move at low speed toward extrusion die (20) until it reaches almost the end of its stroke. See FIG. 6. The distance between the absolute end of the stroke for piston (16) and where the PLC (60) stops the piston (16) on its first compression cycle is adjustable, the objective being to form a $CO_2$ "puck" (100) in place at the extrusion die (20), which will act to contain the next injection of liquid $CO_2$ and prevent the escape of $CO_2$ vapor by way of one or more extrusion ports (22).

Figure 8:
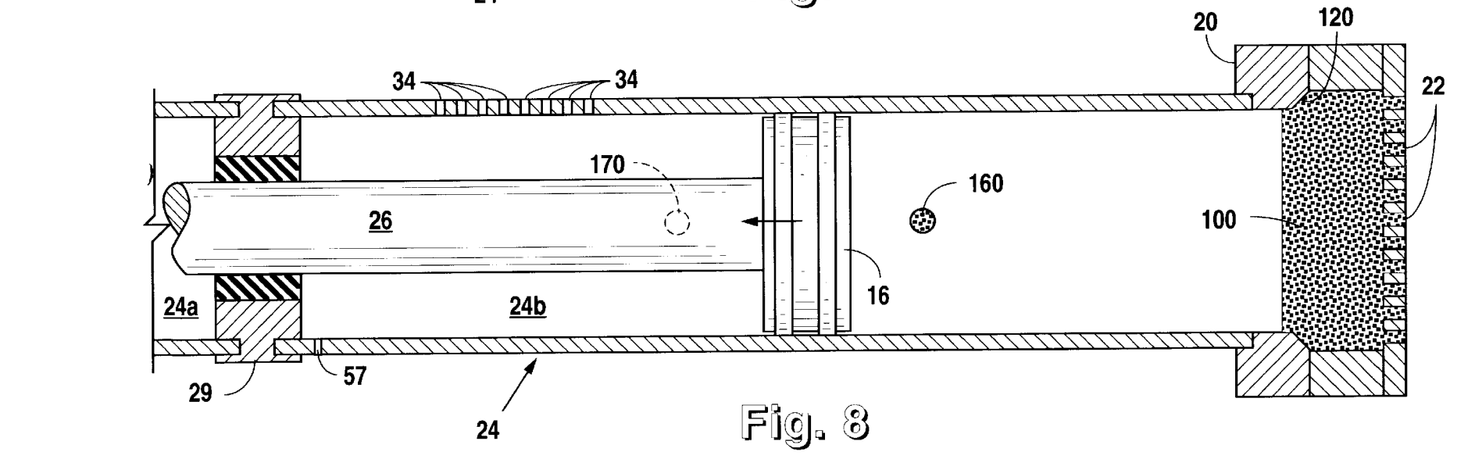
FIG. 8 is a side, cross-sectional, view of a compression cylinder within the present invention with the piston in the middle of its retraction stroke, just after passing the first injection port.

After the puck (100) has been formed, the PLC (60) switches the pelletizer back into the high volume, low pressure mode using pump actuation lead (88), and piston (16) is retracted by piston rod (26) at a speed of greater than 12 inches per second. See FIG. 8. Piston (16) is retracted at high speed until it returns to the fully retracted position.

Figure 9:
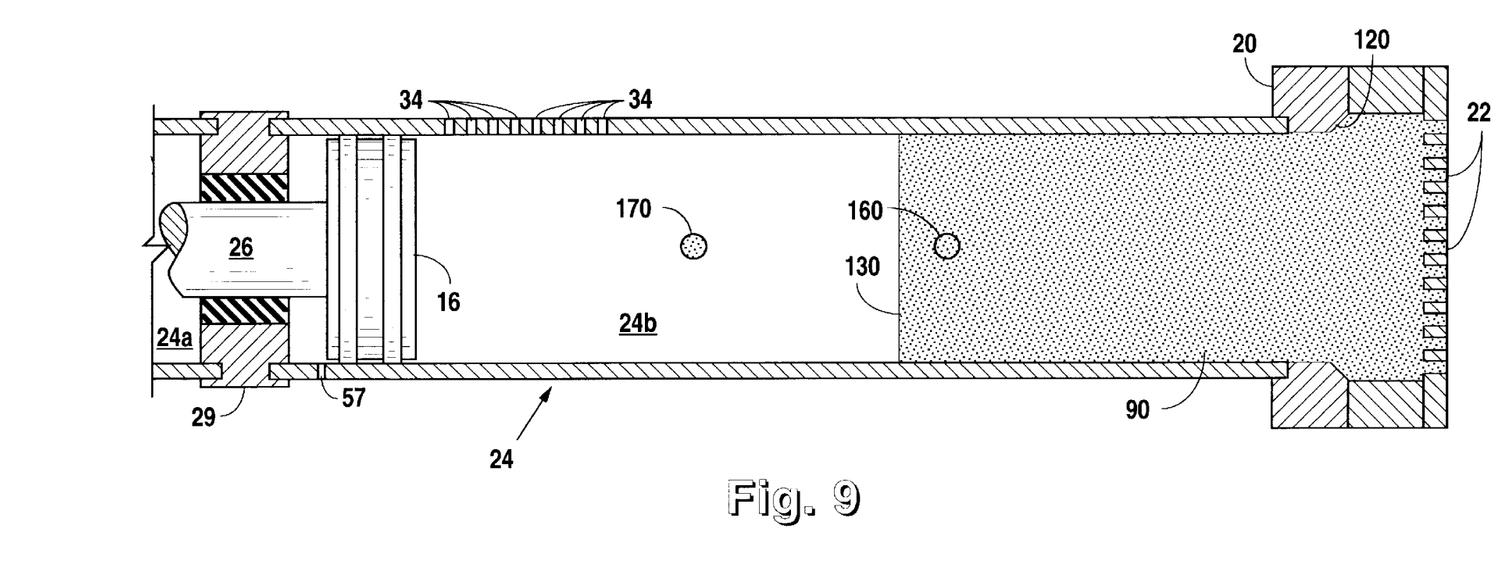
FIG. 9 is a side, cross-sectional, view of a compression cylinder within the present invention with the piston fully retracted as the second injection port is used to finish filling the cylinder with $CO_2$ snow.

However, during this retraction stroke, the first injection port (160) is opened, and liquid $CO_2$ is injected into the interior of compression cylinder (24b), after piston (16) has passed port (160). As piston (16) continues to travel down compression cylinder (24b), it will pass second injection port (170) and one or more venting ports (34). After piston (16) passes second injection port (170), and just before full retraction occurs, liquid $CO_2$ is injected through second injection port (170) into the interior of compression cylinder (24b). See FIG. 9. By locating one or more venting ports (34) close to and behind second injection port (170), the force of liquid $CO_2$ injection keeps the venting ports (34) clear. This method of staggered and overlapped injection, via first injection port (160) and second injection port (170) allows the compression cylinder (24b) to fill more completely with $CO_2$ snow. Even though more $CO_2$ snow is captured, the degas time is less than it would be in a conventional pelletizer because venting ports (34) have been kept clear. After the injection timers for injection ports (160) and (170) have timed out, the PLC (60) degas timer is started and the extrusion part of the cycle begins again.

Figure 7:
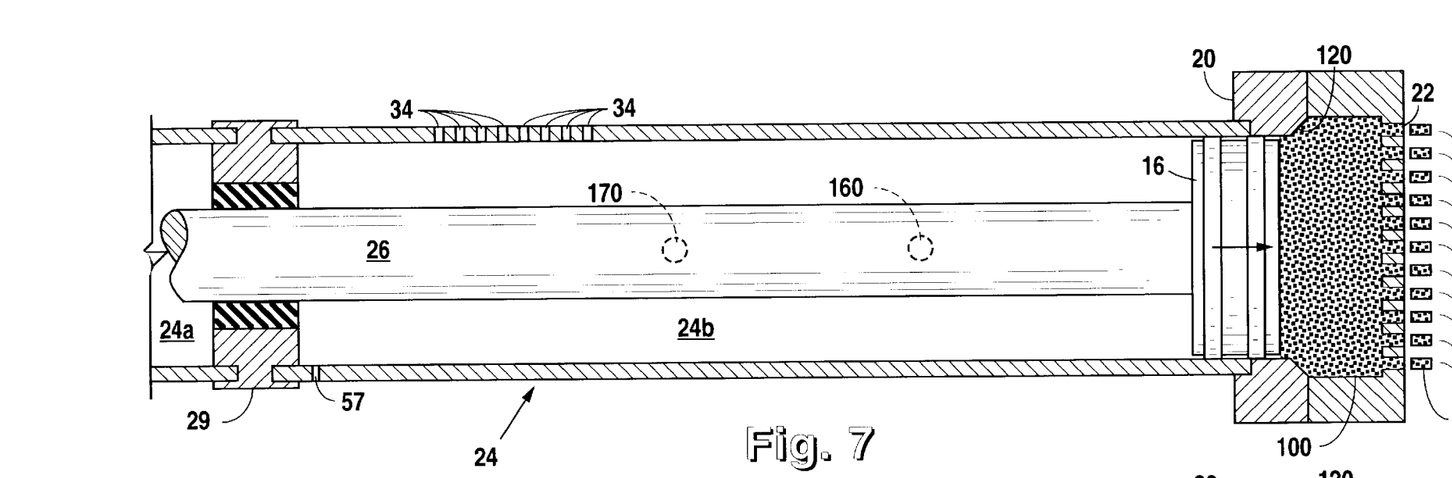
FIG. 7 is a side, cross-sectional, view of a compression cylinder within the present invention with the piston fully extended and puck formation completed.

Turning now to FIG. 7, the extrusion of dry ice pellets (44) can be seen. Once a puck (100) has been formed at the interior face of extrusion die (20), and compression cylinder (24b) has been filled with $CO_2$ snow, piston (16) may advance in the low volume, high pressure mode to urge the $CO_2$ snow (90), which now almost completely fills compression cylinder (24b), toward extrusion die (20). Since puck (100) has already been formed in place, the $CO_2$ snow will now be compacted and forced against puck (100) so as to urge the puck (100) through extrusion ports (22) to form solid dry ice pellets (44).

The improved method of the instant invention can be easily applied as a retrofit to conventional pelletizer machines by the application of sensing elements (hydraulic pressure and cylinder fill pressure sensors), an additional liquid $CO_2$ injection port, and a programmable-logic controller to automate operations (usually already existing in the conventional pelletizer).

It has been discovered that more effective use of puck (100) can be made if extrusion die (20) contains a chamfered region to contain puck (100) during high speed retraction of piston (20). As illustrated in FIG. 7, this chamfered area is shown as die chamfer (120). When piston (20) retracts at high speed, a low pressure zone is created behind puck (100) which results in pulling puck (100) into compression cylinder (24b) due to the atmospheric pressure force exerted against puck (100) via extrusion ports (22). Die chamfer (120) acts to trap puck (100) in place, preventing breaking or cracking of puck (100), which requires recreation of a new puck (100) within compression cylinder (24b).

It has also been discovered that the ideal configuration of an improved pelletizer includes a pair of cylinders (24) configured so that the extrusion/retract portion of the cycle in one cylinder can be matched to the fill/degas part of the cycle for the other cylinder. This allows one side or the other to be in use at any given time, fully utilizing the available hydraulic power supply. The most efficient use of hydraulic fluid requires that it be cycled directly between the pair of cylinders (24). A less efficient method of cycling fluid, but easier to accomplish, is to pump the hydraulic fluid into and out of a reservoir (not shown) between the pair of cylinders (24). It has also been determined that due to the differences in performance between such a pair of cylinders (24), individual performance parameters (e.g., internal cylinder fill pressure, injection timing, etc.) must be adjustable for each cylinder (24).

Finally, since the degas time of compression cylinder (24b) directly effects the total cycle time for production of dry ice pellets (44), any decrease in the degas time will speed up production. This can be effected by increasing the available area of one or more venting ports (34) by the use of additional venting holes in compression cylinder (24b); a more sophisticated method might include the use of a 360° cylindrical filter cartridge, such as that illustrated in U.S. Pat. No. 5,419,138, issued to Anderson et al.

It is anticipated that the invention described herein can also be implemented using more than two injection ports along the length of the extrusion cylinder. This is simply a matter of staggering the location of several injection ports, located in a linear fashion along the length of the extrusion cylinder, and staggering/overlapping the timing of injection for liquid $CO_2$ at each port to occur as the piston is retracted along the length of the extrusion cylinder (not shown). Furthermore, the method and apparatus described herein also anticipates the use of tracking the location of the piston within the extrusion cylinder so that the introduction of liquid $CO_2$ at each injection port can be optimally accomplished with respect to the location of the piston within the cylinder. That is, as the piston passes each injection point, liquid $CO_2$ may be injected and, optionally, vented by way of additional venting ports located along the length of the cylinder (proximate to each injection port). These co-located injection ports and venting ports can be operated as a series of timed valves connected to a PLC. Any and all of these improvements would further increase the speed of dry ice pellet production, but at increased cost and complexity.

Terms such as "left," "right," "up," "down," "bottom," "top," "front," "back," "in," "out," and like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

I claim:

1. A method of forming pelletized dry ice from a source of liquid $CO_2$, said method comprising the steps of:

a. injecting said liquid $CO_2$ from said source into a cylinder at at least two injection ports spaced along said cylinder to deposit snow in said cylinder;

b. degassing said cylinder through vents from the cylinder to remove carbon dioxide vapor formed while depositing snow in said cylinder;

c. moving a pressure piston along said cylinder to (1) close said vents with said piston, (2) then close said injection ports and (3) compress said snow toward an extrusion end of said cylinder, said vents being located further from said extrusion end than said injection parts;

(d) forming a puck of solid $CO_2$ at said extrusion end of said cylinder;

(e) extruding solid $CO_2$ from said intrusion end of said cylinder in response to said moving step;

(f) chamfering said puck during said forming of said pack prior to said extruding step;

(g) retracting said pressure piston along said cylinder away from said extrusion end;

(h) repeating said injection step with said liquid $CO_2$ after said pressure piston passes thereby during said retraction step; and (i) simultaneous operation of at least two of said cylinders and pressure pistons to form a tandem operation wherein one of said pressure pistons is compressing at the same time as another of said pressure pistons is retracting.

2. The method of forming pelletized dry ice as recited in claim 1 further including a cutting step to cut extruded solid $CO_2$ into pellets of dry ice.

3. The method of forming pelletized dry ice as recited in claim 2 wherein said cutting step includes moving a cutting blade along an outer surface of said extrusion end to cut extruded solid $CO_2$.

4. The method of forming pelletized dry ice as recited in claim 1 further including repeat said forming step to form said puck of solid $CO_2$ by repetitively cycling said pressure piston.

5. The method of claim 1 wherein a first of said injection ports is approximately one-third of the distance along said cylinder and a second of the injection ports is positioned approximately two-thirds of the distance along said cylinder measured from the distal end but still remains between said vent opening and said distal end.

6. The method of claim 1 including the step of controlling said injection of liquid $CO_2$ through said injection ports wherein said pressure piston operates as a valve controlling liquid $CO_2$ injection.

7. The method of claim 1 wherein said pressure piston operates as a valve controlling operation of said gas vent opening.

8. The method of claim 1 including during said extruding step removing the dry ice by applying pressure to pressure piston to force said dry ice from said distal end head in a pellet of preselected size.

* * * * *